United States Patent [19]
White

[11] 3,976,359
[45] Aug. 24, 1976

[54] INSTANT COLOR MOVIE SCREEN

[76] Inventor: Addison A. White, 518 Wealthy SE., Grand Rapids, Mich. 49503

[22] Filed: Dec. 2, 1974

[21] Appl. No.: 528,984

[52] U.S. Cl. .............................. 350/126; 350/117
[51] Int. Cl.² ........................................ G03B 21/60
[58] Field of Search ............ 350/117, 124, 126, 127

[56] References Cited
UNITED STATES PATENTS

| | | | |
|---|---|---|---|
| 1,226,663 | 5/1917 | Hochstetter | 350/124 |
| 1,229,044 | 6/1917 | Davis | 350/124 X |
| 1,399,566 | 12/1921 | Lazarus | 350/126 |
| 1,998,054 | 4/1935 | McBurney | 350/126 |
| 2,378,252 | 6/1945 | Staehle et al. | 350/126 |
| 2,791,002 | 5/1957 | Clark | 350/124 X |
| 3,205,772 | 9/1965 | Guske | 350/117 |
| 3,251,264 | 5/1966 | Jacobson | 350/117 |
| 3,614,199 | 10/1971 | Altman | 350/126 |

FOREIGN PATENTS OR APPLICATIONS

| | | | |
|---|---|---|---|
| 1,246,275 | 8/1967 | Germany | 350/117 |
| 672,041 | 10/1964 | Italy | 350/117 |

Primary Examiner—Joseph W. Hartary
Assistant Examiner—Alan Mathews

[57] ABSTRACT

An instant color movie screen providing the screening of black and white films to have the appearance of color and also to enhance the color images of color movies, the screen consisting of a flexible soft backed vinyl sheeting wound about a spring loaded roller supported on an adjustable tripod stand and with the sheeting having a multitude of orange colored highly reflective glass or plastic beads affixed to the screen face thereof. A modified embodiment provides for a series of high intensity orange colored lights mounted above the screen to provide orange highlights on a conventional white colored screening to provide black and white films with the appearance of color as well as to enhance the color images of color films projected onto the screen.

1 Claim, 5 Drawing Figures

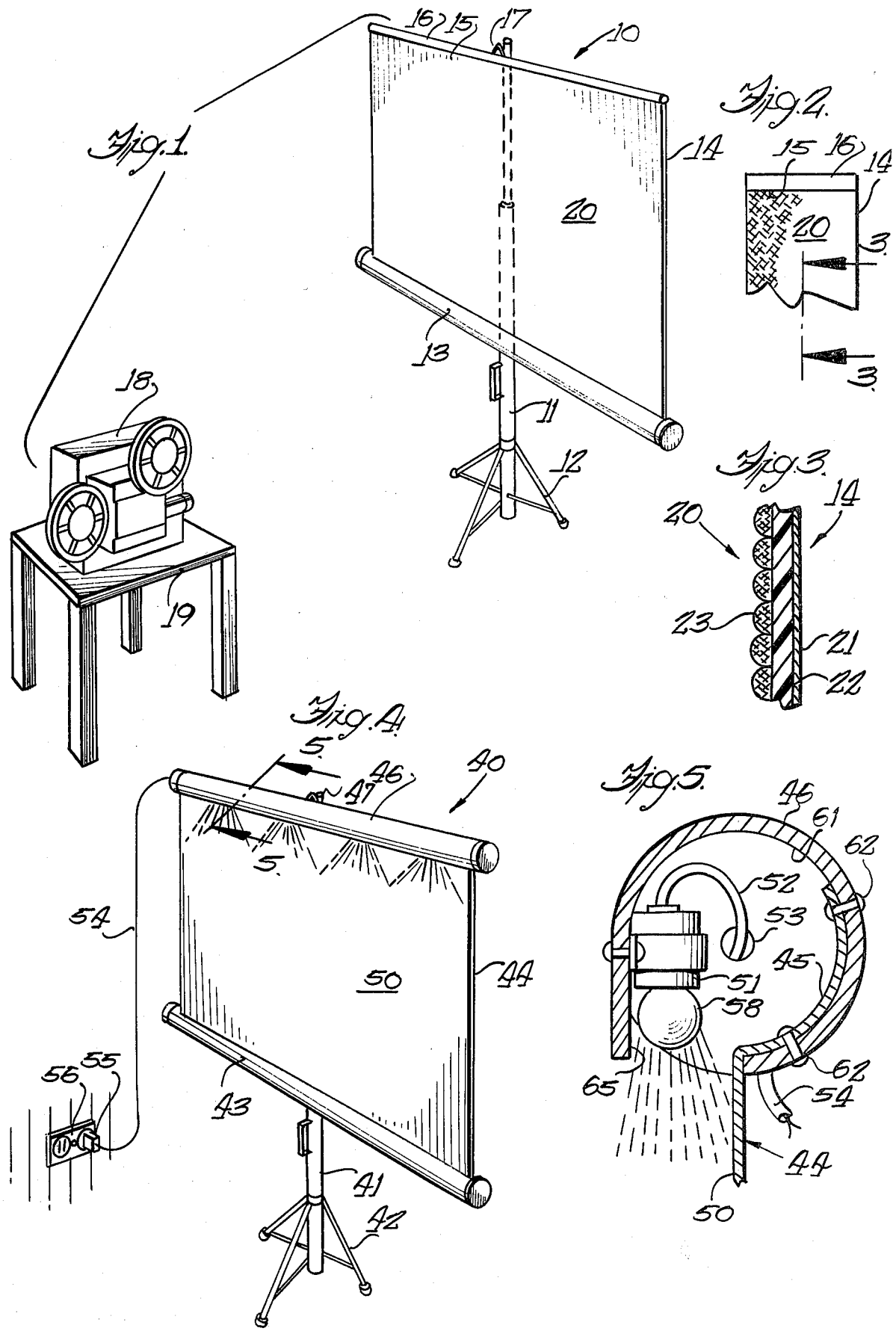

INSTANT COLOR MOVIE SCREEN

BACKGROUND OF THE INVENTION

1. Field of the Invention

This invention relates generally to movie screens and more particularly to a novel and improved movie screen providing an instant color appearance for black and white films along with a screen which enhances the color images of color movies projected thereon.

2. Description of the Prior Art

Presently available movie screens are white or silvered in color in order to provide true to life images on the screen in the color established by the movie film being projected by light onto the screen. Such white or silvered colored screens allow black and white movies to be viewed in black and white and color movies to be viewed in color.

However, in view of the popularity of color movies over black and white movies, it would be desirable to provide some appearance of color when viewing such black and white movies.

In addition, it is well known that color movies which are old or poorly processed start losing their actual color images so that when shown on conventional white or silvered screens are poor in quality. It would thus be desirable to provide a screen which would enhance a color image of color movies.

SUMMARY OF THE INVENTION

The present invention provides a novel instant color movie screen for displaying thereon both black and white movies as well as color movies with the black and white movies projected thereon having the appearance of color and with color movies projected thereon having their actual color images enhanced.

It is a feature of the present invention to provide an instant color movie screen.

A further feature of the present invention provides an instant color movie screen which is relatively simple in its construction and which threfore may be readily manufactured at a relatively low cost and by simple manufacturing methods so that it can be retailed at a sufficiently low price to encourage widespread use thereof among the general public.

Still a further feature of the present invention provides an instant color movie screen which is easy to use and reliable and efficient in operation.

Yet still a further feature of the present invention provides an instant color movie screen which is of a rugged and durable construction and which therefore may be guaranteed by the manufacturer to withstand many years of intended usage.

Still yet a further feature of the present invention provides an instant color movie screen which is aesthetically pleasing and refined in appearance.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a movie screen of the invention set up for having movies projected thereonto;

FIG. 2 is a fragmentary front elevational view of a front surface of the movie screen;

FIG. 3 is an enlarged cross-sectional view taken along line 3—3 of FIG. 2;

FIG. 4 is a perspective view of a modified form of the invention; and

FIG. 5 is an enlarged cross-sectional view taken along line 5—5 of FIG. 4.

DESCRIPTION OF THE PREFERRED EMBODIMENTS

Referring now to the drawings in detail and in particular to FIGS. 1 to 3 inclusive, a first preferred form of an instant color movie screen constructed in accordance with the principles of the present invention is illustrated and designated generally in its entirety by the reference numeral 10 and is comprised of a telescoping vertical mast 11 having an adjustable tripod stand 12 at the bottom thereof and a pivotally mounted screen containing roller casing 13 in which there is disposed in a manner rolled about the spring biased roller a length of screening 14 having a top edge 15 which is secured to a rigid bar 16 having a hook 17 centrally thereof adapted to be hooked to the top of the mast 11 for holding the screen 14 in an extended open position. A movie projector 18 is illustrated resting on a table 19 in position to project images from movie films onto the face surface 20 of the screen 14.

The screen 14 is manufactured of a flat sheet of cloth fabric material 21 having a layer of vinyl sheeting 22 affixed thereover in juxtaposition therewith. A multitude of glass or plastic orange colored beads 23 of a light reflective material are affixed in touching side-by-side engagement to the front surface of the vinyl sheeting 22 and form the front screen surface 20 completely extending thereover.

When movies are projected onto the orange colored beads 23 forming the face surface 20 of screen 14, such movies in black and white seem to have the appearance of color. Further, if such movies being projected onto the screen are of a color film, then the orange colored beads enhance the actual color images projected onto the screen, this being especially important when such color films are old or have been poorly processed so that such color images when projected onto a conventional white or silvered screen are poor in quality.

Referring now to the modified form of the screen which is illustrated in FIGS. 4 and 5, the invention is generally designated by a reference numeral 40 and is comprised of a vertical telescoping mast 41 having an adjustable tripod stand 42 affixed to the bottom end thereof and on which there is pivotally mounted an elongated cylindrical casing 43 having screening 44 rolled about a spring biased roller therein, the screen having a top edge 45 which is affixed inwardly of cylindrical housing 46 having a loop 47 centrally thereof adapted to be connected to the top end of mast 41 to hold the screen 44 in its open position.

The screen 44 is of a conventional white or silvered cloth backed vinyl sheeting having a front surface 50.

Disposed in elongated cylindrical housing 46 at spaced intervals therealong are a series of electrical sockets 51 each connected in electrical parallel relationship with each other by means of suitable electrical insulated wiring 52 which extends outwardly of an opening 53 in one end of casing 46 in the form of a cord 54 terminating in electrical plug 55 adapted to be plugged into a conventional source of household power, such as household receptacle 56. Each of the sockets 51 is of a screw thread nature and is adapted to receive therein a high intensity orange colored lamp 58.

As seen in FIG. 5, the top edge of screen 44 is affixed to the interior 61 of casing 46 by means of a plurality of rivets 62.

Further, as seen in FIG. 5, the casing 46 is provided with an elongated rectangularly configured slot 65 extending completely therealong in a position immediately above and adjacent to the screen front surface 50 such that light emitted from lamp 58 impinges substantially tangentially on the front surface 50 of the screen 44 to provide an orange effect thereon.

The orange effect achieved on the front surface 50 of screen 44 by lamps 58 provide the same effect as the orange beads 23 of embodiment of FIGS. 1–3 as to providing an appearance of color to black and white films projected onto the screen, as well as to enhance the color image of color films projected onto the screen.

It is to be understood that the form of this invention herewith shown and described is to be taken as preferred examples of the same, and that this invention is not to be limited to the exact arrangement of parts shown in the accompanying drawings, or described in this specification as various changes in the details of construction as to shape, size, and arrangement of parts may be resorted to without departing from the spirit of the invention, the scope of the novel concepts thereof, or the scope of the sub-joined claims.

Having thus described the invention what is claimed is:

1. An instant color movie screen comprising, in combination:

a vertical telescoping mast having a top portion and a bottom portion, an adjustable tripod stand affixed to said bottom portion for supporting said mast in a vertical position, an elongated cylindrical housing pivotally mounted at its midpoint to a position on said vertical mast for rotation thereabout between the hearing position and a horizontal operative position, a length of screen material disposed about a roller spring biased and journaled for rotation in said cylindrical casing, with said screen having a top edge, a rigid rod affixed along said top edge of said screen, and a hook affixed centrally of said rigid rod adapted to affix said screen in an open operative position extending along a portion of said vertical mast and engaging a hook disposed on the top end portion of said mast;

a length of flat cloth material having a back surface and a front surface, a length of flat vinyl sheeting material having a front surface and a back surface, means of fixing said vinyl sheeting in juxtaposition with said cloth material with said back surface of said vinyl sheeting in juxtaposition with said front surface of said cloth material, and a multitude of generally glass or plastic spherical beads each of an orange color and each manufactured of a light reflecting material affixed to said front surface of said vinyl sheeting, each bead contacting each bead surrounding it to provide a solid appearing orange color light reflecting surface completey over said vinyl sheeting;

an elongated hollow closed end cylindrical rigid member affixed to said top edge of said screening and extending completely therealong, a compartment defined interiorly of said top cylindrical member, a hanging member affixed centrally of said top rigid member adapted to secure the same to the top end portion of said vertical mast to retain said screening in an open operative position, and orange colored light emitted from said top member impinging on a front surface of said screen to provide an orange overall color to said screen front surface; and said top edge of said screen being affixed to an interior circumference of said cylindrical top member by rivets extending through a side wall of said top member, a plurality of electrical sockets affixed in said compartment, electrically insulated wiring means connecting said socket in electric parallel relationship with each other, an aperture in one end of said cylindrical top member, an electrical cord having an electrical plug affixed to one end thereof adapted to be plugged into a conventional household receptacle with the opposite end of the cord affixed to the wiring connecting said socket in an electrical parallel relationship, a plurality of orange colored high intensity electric lamps with one lamp for each socket and each lamp being threadably received in its associated socket to be electrically energized thereby, an elongated rectangularly configured slot disposed on a side wall of said cylindrical top member extending along a top surface of said screen disposed between said orange colored lamps and said screen, and whereby said orange colored light from said lamps completely covers the front surface of said screen with said light rays impinging on said screen at an angle not interferring with the image of the movie projecting on said screen.

\* \* \* \* \*